US008792145B2

(12) United States Patent (10) Patent No.: US 8,792,145 B2
Nishikawa (45) Date of Patent: Jul. 29, 2014

(54) IMAGE READING APPARATUS WITH CLEANING MEMBER ON ONE READING UNIT HIGHER IN CLEANING ABILITY THAN CLEANING MEMBER ON THE OTHER READING UNIT

(75) Inventor: Hiroshi Nishikawa, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 549 days.

(21) Appl. No.: 13/016,500

(22) Filed: Jan. 28, 2011

(65) Prior Publication Data

US 2011/0199653 A1 Aug. 18, 2011

(30) Foreign Application Priority Data

Feb. 15, 2010 (JP) ................................. 2010-030041

(51) Int. Cl.
*H04N 1/04* (2006.01)
(52) U.S. Cl.
USPC ............ 358/474; 358/483; 358/461; 358/498
(58) Field of Classification Search
USPC ......................................... 358/474, 461, 498
See application file for complete search history.

(56) References Cited

U.S. PATENT DOCUMENTS

| 2004/0008386 A1* | 1/2004 | Shiraishi ........................ 358/474 |
| 2007/0201113 A1 | 8/2007 | Nishikawa et al. |
| 2008/0239416 A1 | 10/2008 | Kato et al. |

FOREIGN PATENT DOCUMENTS

| CN | 101031015 A | 9/2007 |
| JP | 2004-048184 A | 2/2004 |
| JP | 2008-252387 A | 10/2008 |

OTHER PUBLICATIONS

Kawamoto et al., Image Reader, Feb. 12, 2004, JP 2004048184 A.*
Office Action (Notice of Grounds of Rejection) dated Jan. 17, 2012, issued in the corresponding Japanese Patent Application No. 2010-030041, and an English Translation thereof. (4 pages).
Official Action issued by the Chinese Patent Office on May 24, 2013 in Chinese Application No. 201110041300.0, and English language translation of Official Action (28 pgs).

* cited by examiner

*Primary Examiner* — Benny Q Tieu
*Assistant Examiner* — Martin Mushambo
(74) *Attorney, Agent, or Firm* — Buchanan Ingersoll & Rooney PC

(57) ABSTRACT

An image reading apparatus includes a conveying unit for conveying documents one by one, a first reading unit for optically reading the conveyed document through a first transparent member provided at a first reading position on a conveying path in the conveying unit, a first cleaning unit for cleaning the first transparent member provided at the first reading position, a second reading unit for optically reading the conveyed document through a second transparent member provided at a second reading position on the conveying path in the conveying unit and on a downstream side of the first reading position, and a second cleaning unit for cleaning the second transparent member provided at the second reading position. The second cleaning unit is higher in cleaning ability than the first cleaning unit.

20 Claims, 15 Drawing Sheets

IMAGE READING APPARATUS WITH CLEANING MEMBER ON ONE READING UNIT HIGHER IN CLEANING ABILITY THAN CLEANING MEMBER ON THE OTHER READING UNIT

This application is based on Japanese Patent Application No. 2010-030041 filed with the Japan Patent Office on Feb. 15, 2010, the entire content of which is hereby incorporated by reference.

BACKGROUND OF THE INVENTION

1. Field of the Invention

The present invention relates to an image reading apparatus, an image forming apparatus and an automatic document conveying apparatus. In particular, the present invention relates to a sheet-through type automatic document conveying apparatus, as well as an image forming apparatus and an image reading apparatus having the automatic document conveying apparatus mounted thereon.

2. Description of the Related Art

The sheet-through type refers to a type in which an image reading unit at rest reads a surface of a document conveyed by a conveying mechanism. A sheet-through type image reading apparatus has advantages of size reduction, low cost, low noise, and high productivity, as compared with a platen-set type image reading apparatus whose image reading unit moves and reads a document at rest.

In the case of the sheet-through type image reading apparatus, an image reading position is fixed in place, that is, onto a transparent member (elongated reading glass) and a focal point of a reading optical system is obtained on an image surface of the conveyed document through the reading glass.

As a configuration for reading both the front surface and the rear surface of a document by means of the image reading apparatus, a configuration having a mechanism for turning over a document in the apparatus, thereby turning over the document whose front surface has been read and conveying the document again to an image reading position to read the rear surface has been conventionally common. This manner of reading is referred to as single scan reading.

In contrast, demand for an image reading apparatus further including a reading unit and configured to read the front surface and the rear surface of a document at the same time according to the sheet-through scheme has been expanding rapidly in recent years. This manner of reading is referred to as dual scan reading. The dual scan reading allows double-sided reading with the shortest path. Therefore, as compared with the single scan reading, the dual scan reading has advantages including high reliability and reduction in failed conveyance such as a paper jam, in addition to high productivity and low noise.

In the dual scan reading, a lightweight and compact CIS (Contact Image Sensor) is commonly used. The CIS has a feature of shallower depth of focus than that of a CCD (Charge Coupled Device).

A reading mechanism is generally susceptible to a foreign substance such as dust adhered onto the reading glass and dust remaining on the reading glass. A portion where the foreign substance block light leads to an image noise streak in the read image. In the case of a paper document, a trouble that a minute foreign substance such as a fiber and a filler such as calcium carbonate included in the paper adheres to the reading glass cannot be avoided. In particular, in the case of the CIS having a shallow depth of focus, the document must be brought as close to the CIS as possible. Therefore, an adhesive foreign substance (an adhesive substance protruding from an end face of a portion bonded by tape or glue, correction fluid, an ink lump of a pen, an eraser and the like) adhered to the document are easily transferred to the CIS. The adhesive foreign substance transferred and adhered to the CIS is not easily separated.

As a technique of addressing this problem, Japanese Laid-Open Patent Publication No. 2004-048184, for example, discloses a technique in which a rotating body having a cleaning member is provided at a position where the rotating body faces a CIS, and the rotating body is rotated, thereby cleaning a surface of the CIS.

When such a configuration that the CCD reads the front surface of the document and the CIS reads the rear surface is used in the dual scan reading, however, ensuring the equal image quality in both reading mechanisms may be required.

SUMMARY OF THE INVENTION

The present invention has been made in light of these problems and one object of the present invention is to provide an image reading apparatus, an image forming apparatus and an automatic document conveying apparatus that can ensure the image quality on both surfaces in dual scan reading.

In order to achieve the above object, according to an aspect of the present invention, an image reading apparatus includes: a conveying unit for conveying documents one by one; a first reading unit for optically reading the conveyed document through a first transparent member provided at a first reading position on a conveying path in the conveying unit; a first cleaning unit for cleaning the first transparent member provided at the first reading position; a second reading unit for optically reading the conveyed document through a second transparent member provided at a second reading position on the conveying path in the conveying unit and on a downstream side of the first reading position; and a second cleaning unit for cleaning the second transparent member provided at the second reading position, the second cleaning unit being higher in cleaning ability than the first cleaning unit.

According to another aspect of the present invention, an image reading apparatus includes: a conveying unit for conveying a document; an introducing unit formed of a pickup roller and a pickup roller-facing member, for introducing one sheet of a plurality of loaded documents into the conveying unit; a first reading unit for optically reading the conveyed document through a first transparent member provided at a first reading position on a conveying path in the conveying unit and corresponding to a surface of the document on the pickup roller side; a first cleaning unit for cleaning the first transparent member provided at the first reading position; a second reading unit for optically reading the conveyed document through a second transparent member provided at a second reading position on the conveying path in the conveying unit and corresponding to a surface of the document on the pickup roller-facing member side; and a second cleaning unit for cleaning the second transparent member provided at the second reading position, the second cleaning unit being higher in cleaning ability than the first cleaning unit.

Preferably, the pickup roller-facing member is a member producing a friction force between the document and the pickup roller-facing member in a direction opposite to a conveying direction by the pickup roller, Preferably, the pickup roller-facing member is a roller rotating in a direction opposite to a direction of rotation of the pickup roller.

Preferably, the first reading unit includes a CCD (Charged Coupled Device) and the second reading unit includes a CIS (Contact Image Sensor).

Preferably, the first cleaning unit and the second cleaning unit have cleaning members, and clean the first and the second transparent members by moving the cleaning members on the first and the second transparent members, respectively. The cleaning member of the second cleaning unit is slower in moving speed than the cleaning member of the first cleaning unit.

Preferably, a frequency of cleaning by the second cleaning unit is higher than a frequency of cleaning by the first cleaning unit.

More preferably, the image reading apparatus further includes a first control unit for controlling a drive mechanism for the first cleaning unit and a drive mechanism for the second cleaning unit, wherein the first control unit switches the frequency of cleaning by the second cleaning unit in accordance with an image reading mode.

More preferably, the first control unit makes equal the frequency of cleaning by the second cleaning unit and the frequency of cleaning by the first cleaning unit when the image reading mode is a low resolution mode, and makes the frequency of cleaning by the second cleaning unit higher than the frequency of cleaning by the first cleaning unit when the image reading mode is a high resolution mode.

Preferably, each of the first cleaning unit and the second cleaning unit has a cleaning member that is an assembly formed of a plurality of elements, and the assembly of the second cleaning unit is higher in density than the assembly of the first cleaning unit.

Preferably, each of the first cleaning unit and the second cleaning unit has a rigid cleaning member, and the cleaning member of the second cleaning unit is higher in rigidity than the cleaning member of the first cleaning unit.

Preferably, the second cleaning unit has a first cleaning member equal to the cleaning member of the first cleaning unit and a second cleaning member higher in density or rigidity of the assembly than the cleaning member of the first cleaning unit. The image reading apparatus further includes a first control unit for controlling switching of the cleaning members of the second cleaning unit. The first control unit switches the cleaning members of the second cleaning unit in accordance with an image reading mode.

More preferably, the first control unit selects the first cleaning member as the cleaning member used in the second cleaning unit when the image reading mode is a low resolution mode, and selects the second cleaning member as the cleaning member used in the second cleaning unit when the image reading mode is a high resolution mode.

Preferably, the image reading apparatus further includes a second control unit for controlling a drive mechanism for the first cleaning unit and a drive mechanism for the second cleaning unit, wherein the second control unit controls execution of a cleaning operation in the second cleaning unit in accordance with an image reading mode.

More preferably, the second control unit does not cause execution of the cleaning operation in the second cleaning unit when the image reading mode is a single-sided reading mode in which only a surface on the first reading unit side of surfaces of the document is read, and causes execution of the cleaning operation in the second cleaning unit when the image reading mode is a double-sided reading mode in which both surfaces on the first reading unit side and on the second reading unit side are read.

According to still another aspect of the present invention, an image forming apparatus has the above image reading apparatus.

According to a further aspect of the present invention, an automatic document conveying apparatus includes: a conveying unit for conveying documents one by one; a first cleaning unit for cleaning a first transparent member provided at a first reading position on a conveying path in the conveying unit corresponding to a reading position of a reading apparatus for optically reading the conveyed document; a reading unit for optically reading the conveyed document through a second transparent member provided at a second reading position on the conveying path in the conveying unit and on a downstream side of the first reading position; and a second cleaning unit for cleaning the second transparent member provided at the second reading position, the second cleaning unit being higher in cleaning ability than the first cleaning unit.

According to a further aspect of the present invention, an automatic document conveying apparatus includes: a conveying unit for conveying a document; an introducing unit formed of a pickup roller and a pickup roller-facing member, for introducing one sheet of a plurality of loaded documents into the conveying unit; a first cleaning unit for cleaning a first transparent member provided at a first reading position on a conveying path in the conveying unit and corresponding to a surface of the document on the pickup roller side, the first reading position corresponding to a reading position of a reading apparatus for optically reading the conveyed document; a reading unit for optically reading the conveyed document through a second transparent member provided at a second reading position on the conveying path in the conveying unit and corresponding to a surface of the document on the pickup roller-facing member side; and a second cleaning unit for cleaning the second transparent member provided at the second reading position, the second cleaning unit being higher in cleaning ability than the first cleaning unit.

Preferably, the pickup roller-facing member is a member producing a friction force between the document and the pickup roller-facing member in a direction opposite to a conveying direction by the pickup roller.

Preferably, the pickup roller-facing member is a roller rotating in a direction opposite to a direction of rotation of the pickup roller.

Preferably, the reading unit includes a CIS (Contact Image Sensor).

Preferably, the first cleaning unit and the second cleaning unit have cleaning members, and clean the first and the second transparent members by moving the cleaning members on the first and the second transparent members, respectively. The cleaning member of the second cleaning unit is slower in moving speed than the cleaning member of the first cleaning unit.

Preferably, a frequency of cleaning by the second cleaning unit is higher than a frequency of cleaning by the first cleaning unit.

More preferably, the automatic document conveying apparatus further includes a first control unit for controlling a drive mechanism for the first cleaning unit and a drive mechanism for the second cleaning unit, wherein the first control unit switches the frequency of cleaning by the second cleaning unit in accordance with an image reading mode.

More preferably, the first control unit makes equal the frequency of cleaning by the second cleaning unit and the frequency of cleaning by the first cleaning unit when the image reading mode is a low resolution mode, and makes the frequency of cleaning by the second cleaning unit higher than the frequency of cleaning by the first cleaning unit when the image reading mode is a high resolution mode.

Preferably, each of the first cleaning unit and the second cleaning unit has a cleaning member that is an assembly formed of a plurality of elements, and the assembly of the second cleaning unit is higher in density than the assembly of the first cleaning unit.

Preferably, each of the first cleaning unit and the second cleaning unit has a rigid cleaning member, and the cleaning member of the second cleaning unit is higher in rigidity than the cleaning member of the first cleaning unit.

Preferably, the second cleaning unit has a first cleaning member equal to the cleaning member of the first cleaning unit and a second cleaning member higher in density or rigidity of the assembly than the cleaning member of the first cleaning unit. The automatic document conveying apparatus further includes a first control unit for controlling switching of the cleaning members of the second cleaning unit. The first control unit switches the cleaning members of the second cleaning unit in accordance with an image reading mode.

More preferably, the first control unit selects the first cleaning member as the cleaning member used in the second cleaning unit when the image reading mode is a low resolution mode, and selects the second cleaning member as the cleaning member used in the second cleaning unit when the image reading mode is a high resolution mode.

Preferably, the automatic document conveying apparatus further includes a second control unit for controlling a drive mechanism for the first cleaning unit and a drive mechanism for the second cleaning unit, wherein the second control unit controls execution of a cleaning operation in the second cleaning unit in accordance with an image reading mode.

More preferably, the second control unit does not cause execution of the cleaning operation in the second cleaning unit when the image reading mode is a single-sided reading mode in which only a surface on the reading apparatus side of surfaces of the document is read, and causes execution of the cleaning operation in the second cleaning unit when the image reading mode is a double-sided reading mode in which both surfaces on the reading apparatus side and on the reading unit side are read.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
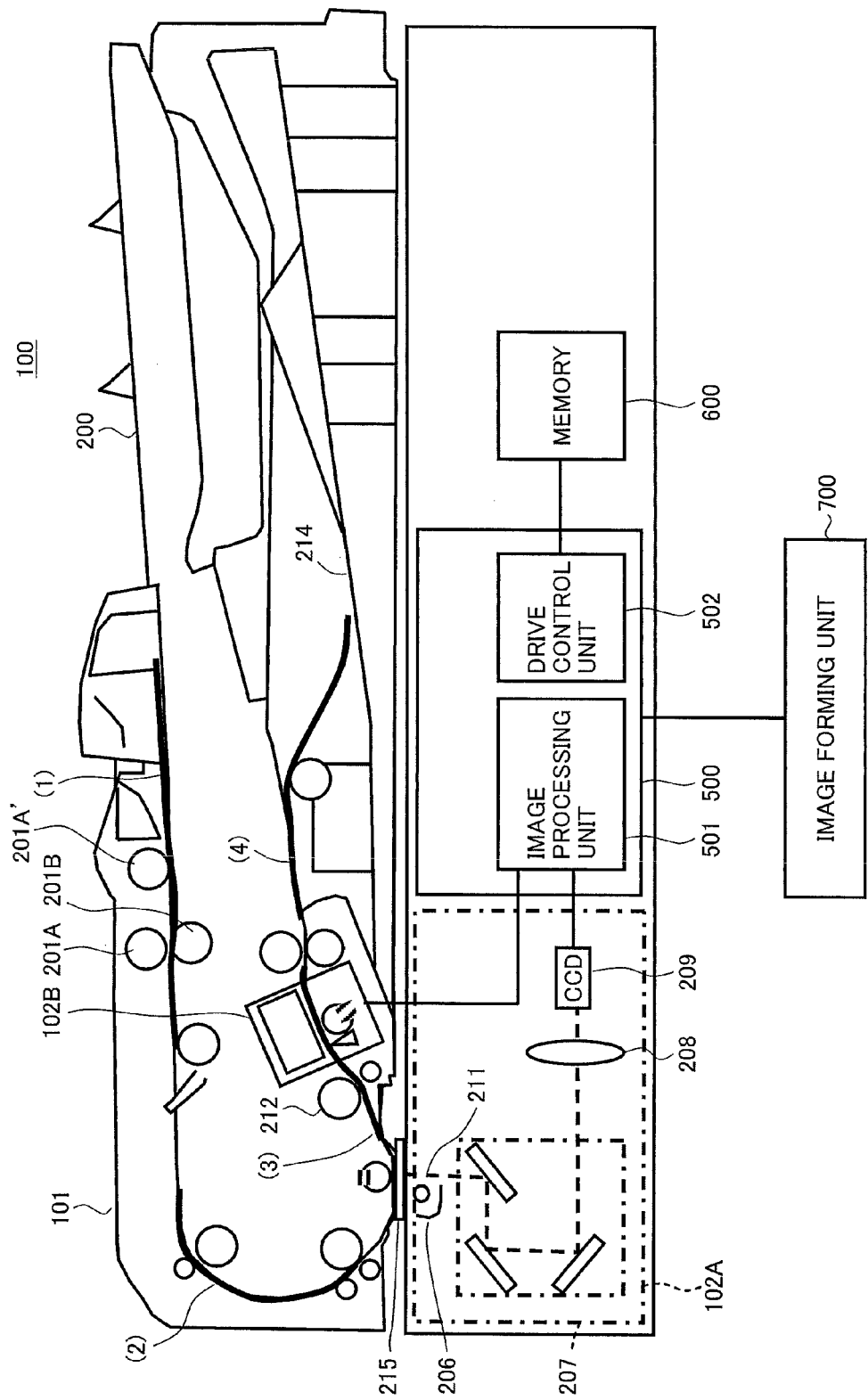
FIG. 1 illustrates a specific example of a configuration of an image reading apparatus according to an embodiment.

Embodiments of the present invention will be described hereinafter with reference to the drawings. In the following description, the same parts and components are denoted with the same reference characters. Their names and functions are also the same.

Referring to FIG. 1, an image reading apparatus 100 according to an embodiment includes an ADF (Auto Document Feeder) unit 101 for automatically conveying a document, a first reading unit 102A for reading the document, a second reading unit 102B provided within ADF unit 101, for reading the document, and a control unit 500 for overall control and image processing.

Image reading apparatus 100 shown in FIG. 1 may be a part of an image forming apparatus such as a copier, a printer, a scanner, a fax machine, or an MFP (Multi Function Peripheral) which is a complex machine having the functions of two or more of these apparatuses.

In ADF unit 101, documents loaded onto a document tray 200 are delivered one by one to a conveying path by pickup rollers 201A, 201A' and a facing member 201B facing pickup roller 201A with the conveying path interposed therebetween. As will be described later, pickup rollers 201A and 201A' exert a force to a paper in a conveying direction, whereas the facing member is for exerting a force to a paper in a direction opposite to the conveying direction so as not to convey a paper that is not in contact with pickup rollers 201A and 201A' (a paper other than the paper located immediately below pickup roller 201A). Specifically, the facing member includes a member such as cork that exerts a friction force in the direction opposite to the conveying direction, a roller that rotates in a direction opposite to a direction of rotation of pickup rollers 201A and 201A', and the like. In this example, a separating roller 201B that rotates in the direction opposite to the direction of rotation of pickup rollers 201A and 201A' is used as facing member 201B.

The delivered document is conveyed through conveying paths (1) and (2) to a reading position 211 of first reading unit 102A. The document that has passed through reading position 211 is conveyed through a document conveying path (3) to second reading unit 102B by a conveying roller 212. Then, the document that has been read by second reading unit 102B follows a conveying path (4) and is ejected to an ejection tray 214. A paper passing sensor 217 is provided in proximity to conveying roller 212 to detect conveyance of the document along the document conveying path (3), First reading unit 102A includes a CCD (Charged Coupled Device). In other words, a light source 206 illuminates a first surface of the document passing through reading position 211, which is shown on the lower side in FIG. 1. Light of the emitted light reflected from the first surface of the document is received by a CCD sensor 209 through a reading glass 215 that is one example of a plate-like transparent member, a group of mirrors 207 and a lens 208. CCD sensor 209 converts a light receiving signal to RGB data by photoelectric conversion and outputs the RGB data to control unit 500.

Second reading unit 102B includes a CIS (Contact Image Sensor) and is provided within ADF unit 101. In other words, referring to FIG. 2, a light source 301 illuminates a second surface of the document passing through a reading position 306 that is a rear surface of the first surface, that is, the surface shown on the upper side in FIG. 1. Light of the emitted light reflected from the second surface of the document is received by a CMOS (Complementary Metal Oxide Semiconductor) sensor 303 through a reading glass 302 that is one example of a plate-like transparent member. CMOS sensor 303 converts respective light receiving signals of R, G and B to the RGB data and outputs the RGB data to control unit 500.

The document is conveyed through first reading unit 102A to second reading unit 102B and the first and second surfaces are read in the respective reading units, which allows double-sided reading without turning over the document in the conveying process. In other words, first reading unit 102A and second reading unit 102B are included in a mechanism for reading both surfaces of a document.

Control unit 500 includes a not-shown CPU (Central Processing Unit), and reads and executes a program stored in a memory 600, thereby implementing an image processing unit 501 that is a function for image processing and a drive control unit 502 that is a function for controlling driving of each unit. These functions may be implemented by processing by the CPU or may be implemented by hardware such as an electrical circuit.

Image processing unit 501 produces image data based on the RGB data from first reading unit 102A and the RGB data from second reading unit 102B.

Drive control unit 502 is connected to a sensor such as paper passing sensor 217 disposed within ADF unit 101, a sensor 312 (see FIG. 2) included in second reading unit 102B, a not-shown control panel and the like, and accepts input of these sensor signals and operation signals. Furthermore, drive control unit 502 is connected to be capable of communicating with a drive mechanism for pickup roller 201A, conveying roller 212 and the like (such as a pulse motor and a motor-driven IC (Integrated Circuit) for controlling the pulse motor), a drive mechanism for first reading unit 102A and a drive mechanism for second reading unit 102B, and controls driving of these mechanisms based on the input sensor signals, operation signals and the like.

Image reading apparatus 100 may be connected to an image forming unit 700 as shown in FIG. 1, and such connection allows image reading apparatus 100 to function as a part of the image forming apparatus such as the MFP. In this case, control unit 500 is electrically connected to image forming unit 700 and outputs produced image data. When image forming unit 700 is a printing apparatus, the produced image data is printed on an output paper and the like.

Referring again to FIG. 2, second reading unit 102B further includes a guide 304 provided immediately below a surface of reading glass 302 along which the document travels, and provided to put the conveying path between guides 304 in order to guide the document in such a manner that the image surface of the document does not come into contact with the glass surface, and a rotating body 310B provided at a position where rotating body 310B faces CMOS sensor 303 at reading position 306 with reading glass 302 interposed therebetween. It is noted that in the following description, "upstream side in the conveying direction" refers to the side with respect to reading position 306 where the document passes through paper passing sensor 217 and is fed (delivered) to reading position 306 by rotation of conveying roller 212, and "downstream side in the conveying direction" refers to the side with respect to reading position 306 where the read document is delivered from reading position 306 by rotation of conveying roller 212.

The document conveyed onto the glass surface of reading glass 302 is guided with the document put between guides 304, and is conveyed from the upstream side to the downstream side in such a manner that the image surface is not in contact with the surface of reading glass 302.

At reading position 306, guide 304 is open both on the side close to reading glass 302 and on the side distant from reading glass 302. Therefore, the document conveyed from the upstream side along guide 304 faces reading glass 302 at reading position 306 with nothing interposed therebetween. When there is no document at reading position 306, rotating body 310B faces reading glass 302 at reading position 306 with nothing interposed therebetween.

Figure 2:
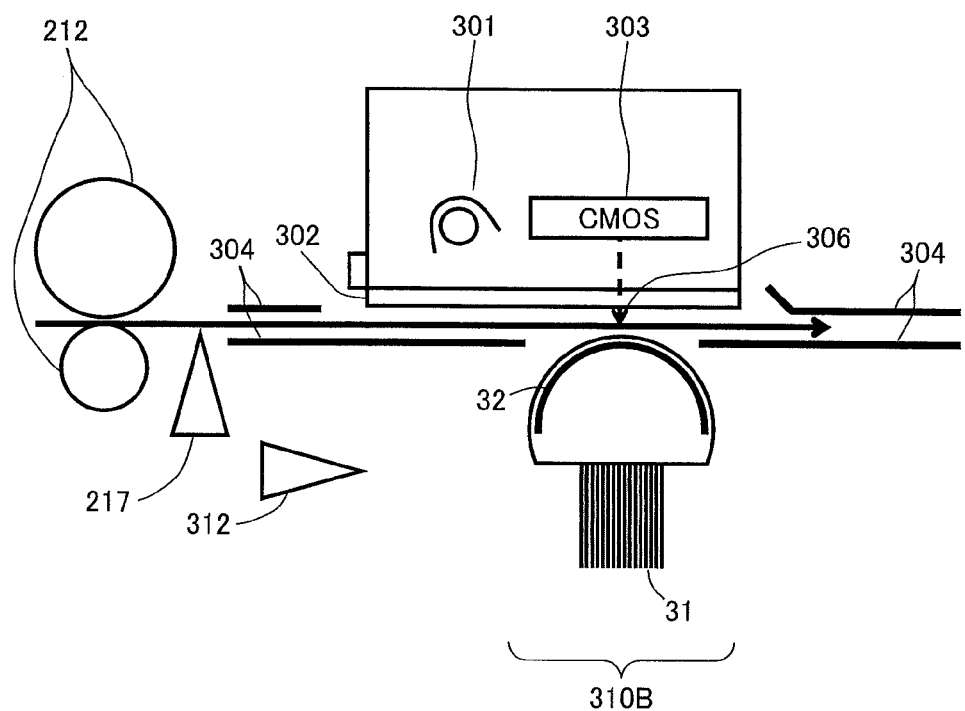
FIG. 2 illustrates a specific example of a configuration of a second reading unit including a CIS (Contact Image Sensor) included in the image reading apparatus.

As shown in FIG. 2, a part of a surface of rotating body 310B is flat and an elastically-deformable brush-like cleaning member 31 is provided on the flat surface. Cleaning member 31 is obtained, for example, by planting a conductive nylon. A white reference surface 32 for shading correction is provided on a surface of rotating body 310B other than the surface provided with cleaning member 31.

Figure 3:
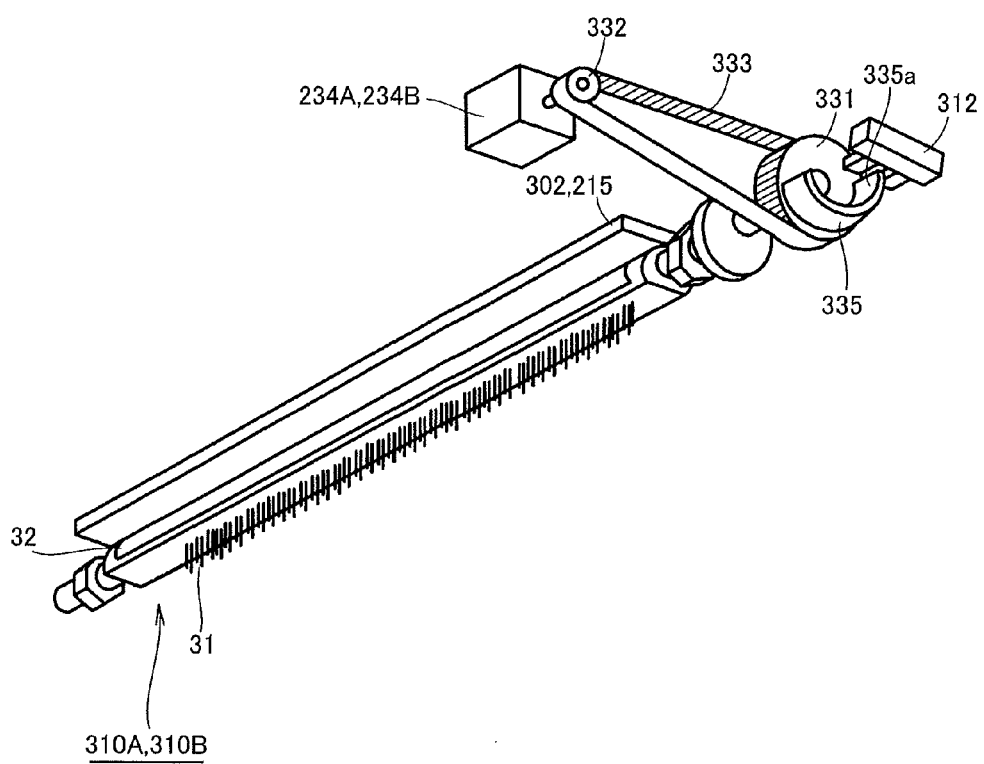
FIG. 3 illustrates a specific example of a configuration of a rotating body included in the second reading unit of the image reading apparatus.

Referring to FIG. 3, rotating body 310B is arranged such that a rotation axis thereof is parallel to the longitudinal direction of reading glass 302 (that is, CMOS sensor 303), and cleaning member 31 and white reference surface 32 are rotatably arranged to face reading position 306 of reading glass 302. Assuming an axis extending along the direction in which the document is conveyed, cleaning member 31 and white reference surface 32 both extend in a line orthogonal to this axis.

A sprocket 331 fixed to one end of rotating body 310B is linked via a timing belt 333 to a sprocket 332 for output of a motor 234B serving as a drive mechanism for rotating body 310B. Motor 234B is a stepping motor that can rotate forward and backward.

Rotating body 310B rotates forward and backward in accordance with a prescribed timing and speed, in association with rotation of motor 234B. Motor 234B serving as the drive mechanism for rotating body 310B rotates in accordance with a control signal from control unit 500. In addition, a pulse signal indicating rotation of motor 234B is output to control unit 500. By counting this pulse signal, control unit 500 can obtain the number of rotations of motor 234B, that is, the amount of rotation of rotating body 310B.

As shown in FIG. 1, first reading unit 102A also includes a rotating body 310A similar to rotating body 310B provided in second reading unit 102B. Rotating body 310A provided in first reading unit 102A also includes a similar cleaning member and a similar white reference surface. Rotating body 310A is also connected to a motor 234A via a timing belt similarly to the configuration of rotating body 310B and rotates with rotation of motor 234A, a part of which is shown in FIG. 3.

Figure 4:
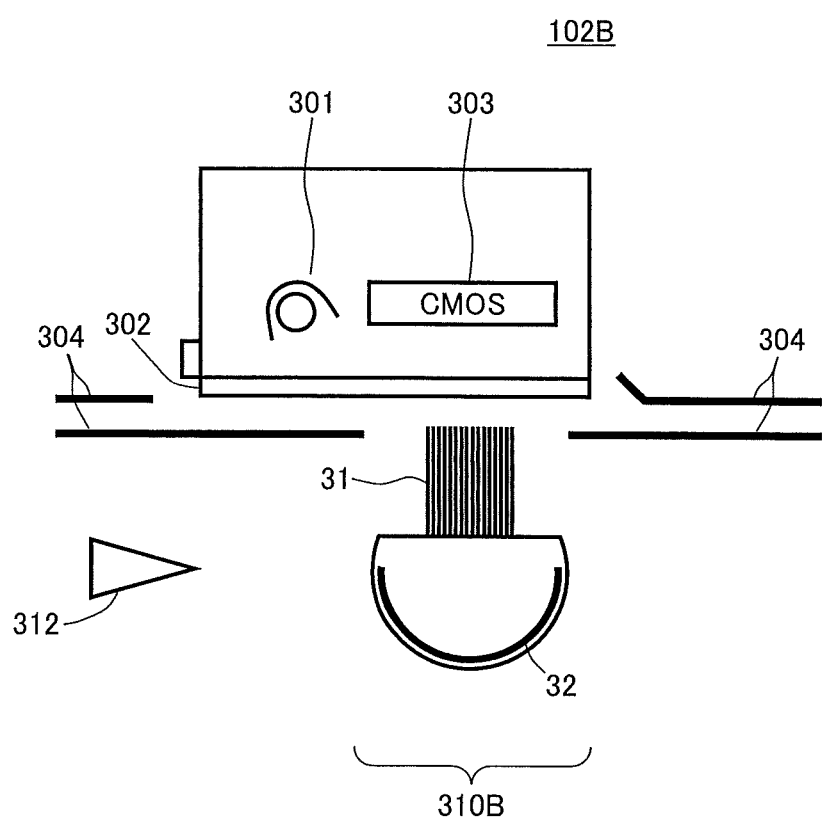
FIG. 4 is a diagram for describing a positional relationship between the rotating body and a reading glass caused by rotation of the rotating body.

With rotation of rotating body 310B, rotating body 310B takes a first position shown in FIG. 2 where white reference surface 32 is located at a position where white reference surface 32 faces reading glass 302 and cleaning member 31 is located at a position where cleaning member 31 does not face reading glass 302, and a second position shown in FIG. 4 where cleaning member 31 is located at a position where cleaning member 31 faces reading glass 302 and white reference surface 32 is located at a position where white reference surface 32 does not face reading glass 302. The first position refers to a position during non-cleaning and a home position, and the second position refers to a position during cleaning. The same applies as well to the positional relationship between rotating body 310A and reading glass 215.

Rotating bodies 310A and 310B wait at the first position, which is the home position. As a result of rotational driving of motors 234A and 234B in accordance with a control signal from drive control unit 502, rotating bodies 310A and 310B rotate clockwise from the first position, which is the home position, through the second position and back to the first position. In association with this rotation, the tip of elastically-deformable brush-like cleaning member 31 rubs the surface of reading glass 302 or reading glass 215. As a result, a foreign substance on reading glass 302 or reading glass 215 is captured by cleaning member 31 and removed from reading position 306 or reading position 211. This operation of causing rotating bodies 310A and 310B to make one rotation or a plurality of rotations is also referred to as "cleaning operation."

The inventor calculated the frequency of occurrence of noise streaks in each of first reading unit 102A (CCD) and second reading unit 102B (CIS) when some high-quality papers actually distributed in the market passed through the image reading apparatus. Specifically, the inventor selected six types of high-quality papers distributed in large amounts in the market, that is, a paper A (unit weight: 80 g/m$^2$, size: 210 mm×297 mm), a paper B (unit weight: 64 g/m$^2$, size: 210 mm×297 mm), a paper C (unit weight: 80 g/m$^2$, size: 210 mm×297 mm), a paper D (unit weight: 80 g/m$^2$, size: 210 mm×297 mm), a paper E (unit weight: 90 g/m$^2$, size: 215.9 mm×279.4 mm), and a paper F (unit weight: 80 g/m$^2$, size: 215.9 mm×279.4 mm). The inventor used, as a document, a high-quality paper on which a particular image was printed, and caused the image reading apparatus to convey and read 500 sheets of each type of the high-quality papers. At this time, the inventor calculated the frequency of occurrence of noise streaks in each of first reading unit 102A (CCD) and second reading unit 102B (CIS) for each paper. The frequency of occurrence of noise streaks is expressed as a ratio (%) of the number of sheets on which noise streaks occurred to the total number of conveyed and read sheets, that is, a value obtained by dividing the number of sheets on which noise streaks occurred by the total number of conveyed and read sheets (here, 3000 sheets), and multiplying the result by 100%.

Figure 6:
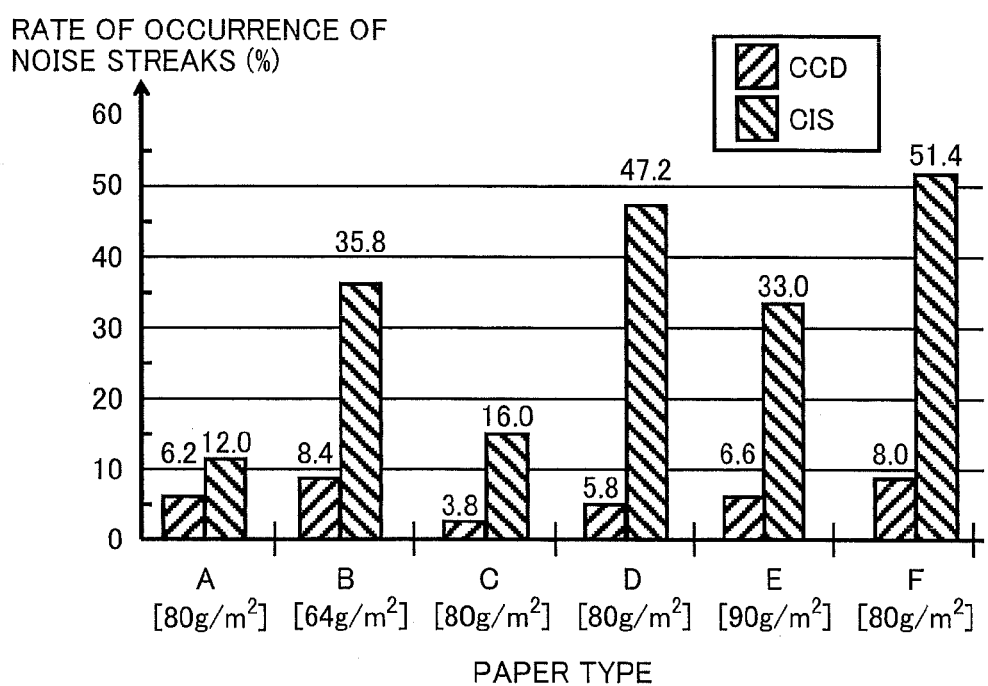
FIG. 6 illustrates the frequency of occurrence of noise streaks in each of a first reading unit (CCD) and the second reading unit (CIS) for each paper type, which is obtained from an experiment by the inventor.

Consequently, as to the frequency of occurrence of noise streaks in each of first reading unit 102A (CCD) and second reading unit 102B (CIS), the relationship as shown by a bar graph in FIG. 6 was obtained in each paper type. In FIG. 6, the frequency of occurrence of noise in first reading unit 102A (CCD) is indicated on the left side in each paper type and the frequency of occurrence of noise in second reading unit 102B (CIS) is indicated on the right side. As is clear from FIG. 6, the frequency of occurrence of noise in second reading unit 102B (CIS) was found to be extremely higher than the frequency of occurrence of noise in first reading unit 102A (CCD) in all paper types.

There were two possible reasons for this, that is, (1) an influence of a paper feeding mechanism and (2) a difference in conveying path. Thus, in order to verify the reason (1), the inventor further calculated the rate of occurrence of noise streaks at each position, as noise streaks tend to occur in second reading unit 102B.

(Reason 1)

Figure 7:
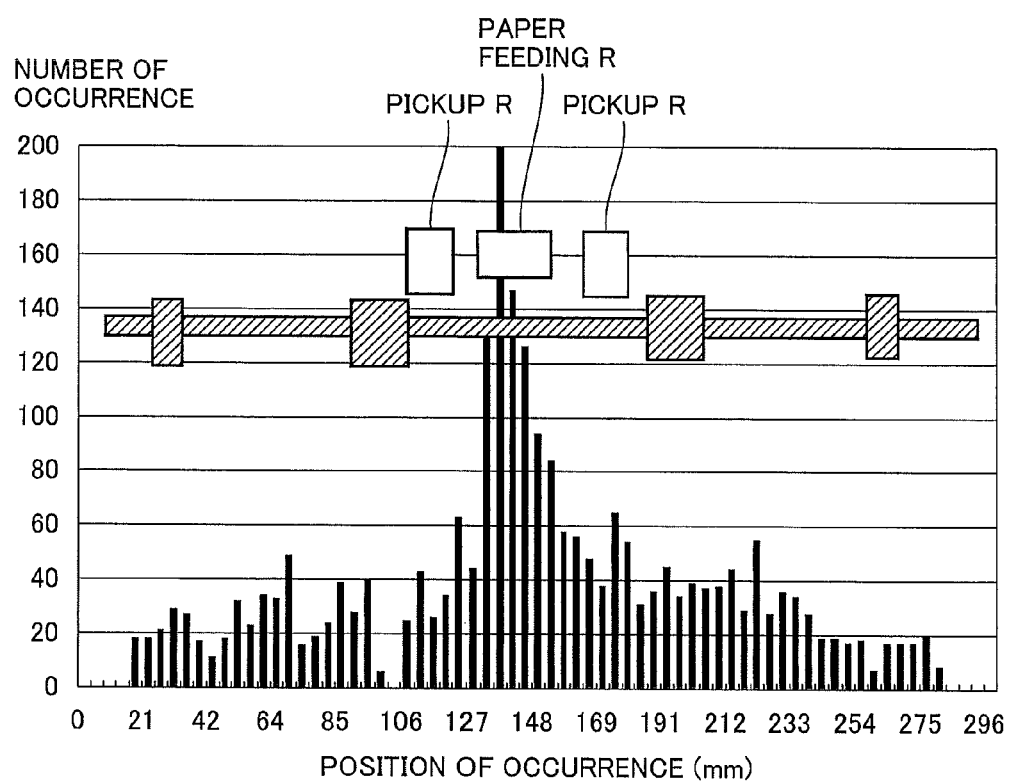
FIG. 7 illustrates a relationship of the rate of occurrence of noise streaks at each position of the second reading unit (CIS), which is obtained from an experiment by the inventor.

Consequently, the relationship as shown by a bar graph in FIG. 7 was obtained as to the rate of occurrence of noise streaks at each position in second reading unit 102B. As is clear from FIG. 7, the rate of occurrence of noise streaks in second reading unit 102B was found to be extremely high at the central part. Furthermore, as to the positional relationship in FIG. 7 between conveying roller 212, separating roller 201B and a position where noise streaks occurred, the rate of occurrence of noise streaks at a position corresponding to separating roller 201B was found to be extremely high and there was found to be no relation between the rate of occurrence of noise streaks and a position corresponding to conveying roller 212. This showed that there was a relation between separating roller 201B and the rate of occurrence of noise streaks in second reading unit 102B.

The paper feeding mechanism for sequentially introducing a plurality of loaded documents one by one onto the conveying path by pickup rollers 201A, 201A' and separating roller 201B of ADF unit 101 will now be described. It is noted that in the following description, pickup roller 201A' is not provided in some cases for the sake of convenience. The paper feeding mechanism has a not-shown drive mechanism for rotationally driving pickup rollers 201A and 201A', and a not-shown drive mechanism for rotationally driving separating roller 201B.

Pickup roller 201A and pickup roller 201A' are linked by a belt and the drive mechanism causes pickup rollers 201A and 201A' to rotate in a direction (driving direction) in which the document in contact with pickup rollers 201A and 201A' is pushed to the conveying path in the conveying direction. As a result, a friction force Fo acts in the conveying direction on the document in contact with pickup rollers 201A and 201A', due to friction with pickup rollers 201A and 201A' as well as a surface of the belt linking these rollers.

Separating roller 201B is pressed against the document at a pressing force Ns of approximately 4 N and the drive mechanism causes separating roller 201B to rotate in the same direction as the driving direction of pickup rollers 201A and 201A'. As a result, a friction force F' acts on the document in contact with separating roller 201B in the direction opposite to the conveying direction, due to friction with a surface of separating roller 201B. It is noted that the drive mechanism for rotationally driving separating roller 201B includes a torque limiter for idling separating roller 201B at a predefined torque value Tr or more. Torque limiter value Tr is set to approximately 4 N, for example. As a result, a maximum value of a rotational torque value of separating roller 201B becomes equal to torque limiter value Tr and separating roller 201B does not rotate at this value or more. A maximum value of friction force F' is given by Tr×R, where R represents the radius of separating roller 201B.

Figure 8:
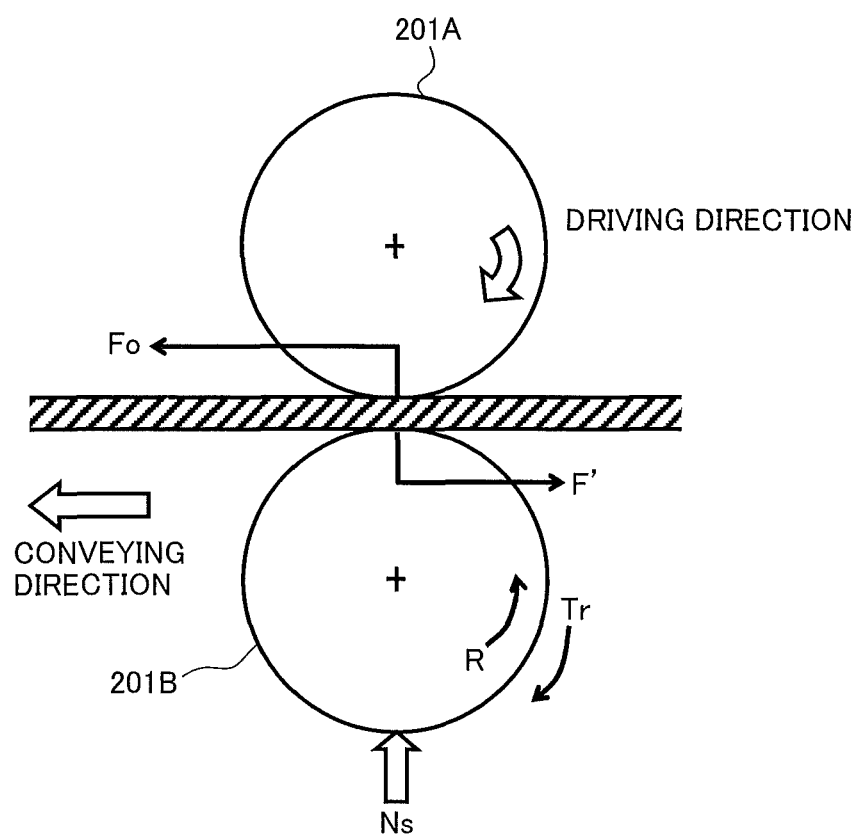
FIG. 8 is a diagram for describing a paper feeding method by a pickup roller and a separating roller.

When there is only one sheet of document between pickup roller 201A and separating roller 201B, pickup roller 201A exerts on the sheet friction force Fo larger than friction force F' exerted by separating roller 201B (Fo>F') as shown in FIG. 8. As a result, separating roller 201B rotates in the direction opposite to the driving direction of pickup roller 201A, which is shown by an arrow R in the figure. At this time, friction force F' produced by separating roller 201B acts on the surface of the document on the separating roller 201B side.

Figure 9:
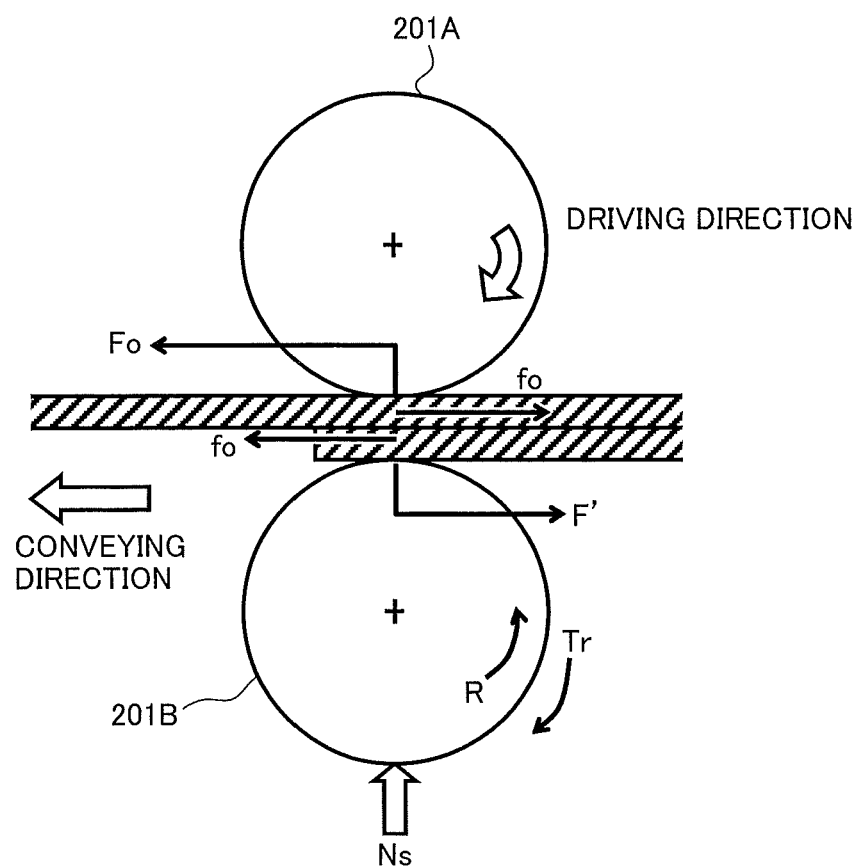
FIG. 9 is a diagram for describing a paper feeding method by the pickup roller and the separating roller.

When there are two sheets of documents between pickup roller 201A and separating roller 201B, a document (first document) in contact with pickup roller 201A is conveyed in the conveying direction due to friction force Fo exerted by pickup roller 201A as shown in FIG. 9. The movement of the first document generates a friction force fo between the first document and a document (second document) in contact with separating roller 201B. Friction force fo is given by μo×Ns, where μo represents a friction coefficient between the documents. Friction force fo acts on the first document in the direction opposite to the conveying direction, and friction force fo acts on the second document in the conveying direction. Since friction force fo is sufficiently smaller than friction force F' exerted on the second document by separating roller 201B, friction force F' prevents double feeding of the second document in the conveying direction. As a result, only the first document is delivered to the conveying path.

Figure 10:
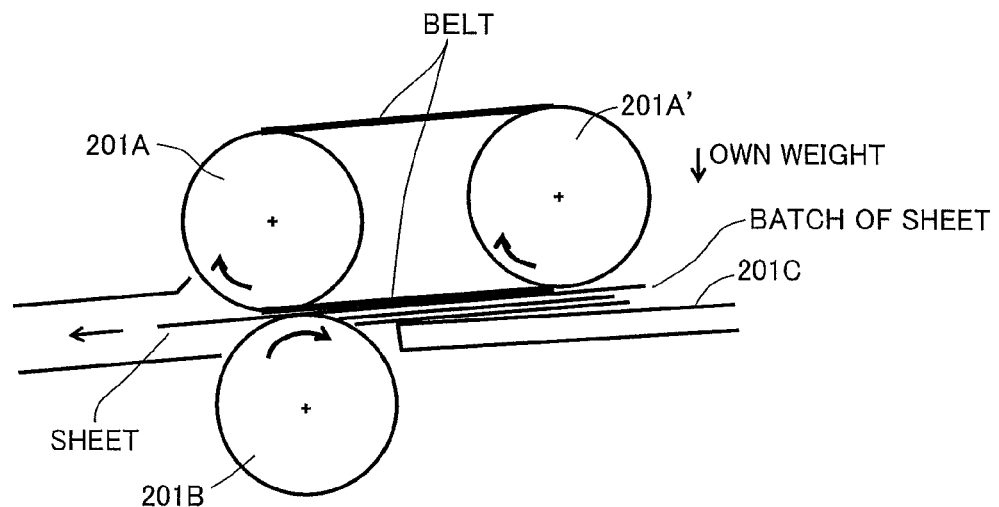
FIG. 10 is a diagram for describing a paper feeding method using a pre-separating plate.

As a configuration for preventing multiple feeding when there are three or more sheets of documents between pickup roller 201A and separating roller 201B, the paper feeding mechanism includes a pre-separating member 201C on the upstream side of separating roller 201B. Pre-separating member 201C is a guide made of a high frictional resistance material such as rubber, and has a plate-like shape, for example. FIG. 10 where the corresponding portion is enlarged shows such an example that a plate-like pre-separating plate 201C is used as the pre-separating member. Referring to FIG. 10, pre-separating plate 201C serving as the pre-separating member is provided as one example such that an end thereof projects to the conveying path on the upstream side of pickup rollers 201A, 201A' and separating roller 201B. As a result, pre-separating plate 201C comes into contact with the surface of the document on the separating roller 201B side and exerts the friction force in the direction opposite to the conveying direction. Since pickup rollers 201A and 201A' exert on the first document friction force Fo larger than the friction force exerted by pre-separating plate 201C, the first document is delivered to the conveying path. Multiple feeding of the documents other than the first document is, however, prevented due to the friction forces exerted by separating roller 201B and pre-separating plate 201C as described above.

As described in the above FIGS. 8 to 10, in the process of delivering the documents one by one by pickup rollers 201A, 201A' and separating roller 201B, friction force F' produced by separating roller 201B and/or the friction force produced by pre-separating plate 201C act on the surface of the document on the separating roller 201B side constantly. As a result, the surface of the document on the separating roller 201B side is rubbed due to the friction forces, which leads to generation of paper dust such as paper fiber. The document is conveyed along the conveying paths (1) to (4) in FIG. 1, and the surface of the document on the separating roller 201B side faces reading glass 302 of second reading unit 102B (CIS). Therefore, as is also shown in FIG. 7, it can be said that noise streaks occur in second reading unit 102B with a high probability due to paper dust generated by separating roller 201B corresponding to the position where the noise streaks occur.

(Reason 2)

Figure 11:
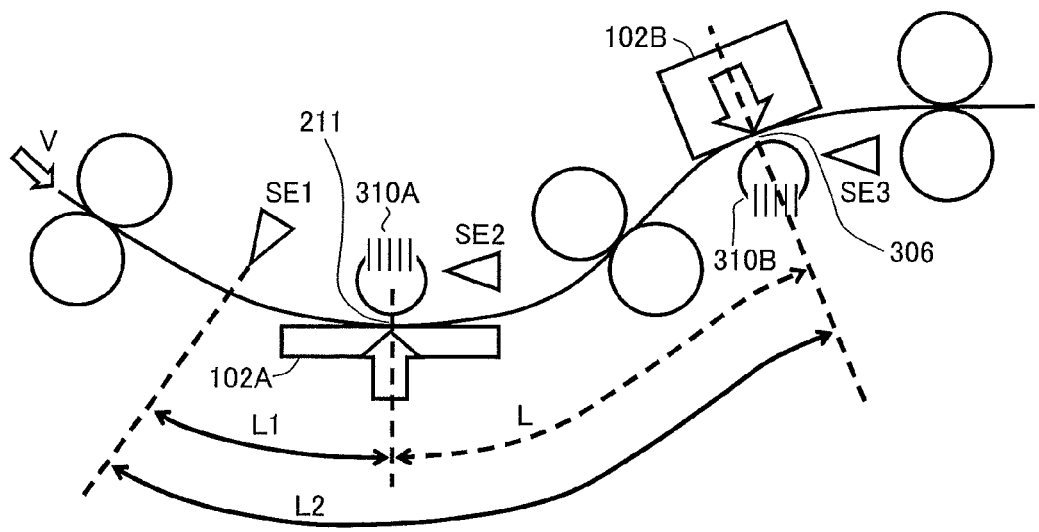
FIG. 11 illustrates a conveying path length to the first reading unit (CCD) and a conveying path length to the second reading unit (CIS) as well as a schematic configuration near the first reading unit (CCD) and the second reading unit (CIS).

The above reason (2) why the frequency of occurrence of noise in second reading unit 102B (CIS) is extremely higher than the frequency of occurrence of noise in first reading unit 102A (CCD) is that the conveying path to the reading position of second reading unit 102B is longer than the conveying path to the reading position of first reading unit 102A by the length of the conveying path from first reading unit 102A to second reading unit 102B, which is indicated with a length L in FIG. 11. In other words, since a force does not act in a direction orthogonal to the conveying direction on the document conveyed along the conveying path, paper dust moves in the conveying direction, while the paper dust does not move in the direction orthogonal to the conveying direction. Accordingly, the paper dust generated after first reading unit 102A moves toward second reading unit 102B located on the downstream side of first reading unit 102A and reaches second reading unit 102B. Therefore, the larger amount of paper dust reaches second reading unit 102B by the amount of paper dust generated as a result of contact between the document and the guide during conveyance from first reading unit 102A to second reading unit 102B. In addition, since the spacing between the guides in CIS is narrower than in CCD, scattering of the paper dust is suppressed and the paper dust adheres to reading glass 302 more easily than to reading glass 215 of first reading unit 102A. Therefore, one of the reasons why the frequency of occurrence of noise in second reading unit 102B (CIS) is extremely higher than the frequency of occurrence of noise in first reading unit 102A (CCD) is the difference in conveying path length.

When the frequency of occurrence of noise in second reading unit 102B (CIS) is extremely higher than the frequency of occurrence of noise in first reading unit 102A (CCD), a difference is made between the front surface and the rear surface of the document in terms of the quality of read images in the case of double-sided reading. In this case, when the read image is printed, for example, a difference is made between the front surface and the rear surface in terms of the quality of the printed image, and the printed image can become hard to see. In particular, when the printed image is bound on two facing pages, the quality on the left page differs from the quality on the right page and the printed image can become very hard to see. Thus, image reading apparatus 100 is configured such that the cleaning ability on the second reading unit 102B (CIS) side is made higher than the cleaning ability on the first reading unit 102A side.

[First Embodiment]

As a first embodiment, in image reading apparatus 100, the cleaning ability on the second reading unit 102B (CIS) side is made higher than the cleaning ability on the first reading unit 102A side by making the number of cleaning in second reading unit 102B larger than the number of cleaning in first reading unit 102A.

The inventor conducted an experiment using the apparatus having the configuration shown in FIG. 2 and checked the cleaning performance of the cleaning member. In the experiment, a brush-like cleaning member made of conductive nylon having a resistivity of 11.5 LogΩ was used, with one bristle having a thickness of 2 D (denier) (15.0 μm) and bristles having a density of 240 kf/inch$^2$. A width L2 of CMOS sensor 303 in the longitudinal direction was set to 309 mm, and the width in the direction in which the document was conveyed was set to 5 mm. In addition, the length of contact with reading glass 302 was set to 1.5 mm±0.5 mm, and the pressing force of rotating body 310B against reading glass 302 was set to 6 N (newton). Rotating body 310B, that is, cleaning member 31 was rotated at a rotation speed of 302 mm/s or less.

In the experiment, the rotating body was rotated with paper dust dispersed uniformly on the reading glass, and the number of paper dust remaining on the reading glass after rotation was checked using a microscope. The number of paper dust was checked in the range having a width of 3.5 mm with respect to the center of rotation.

Figure 5:
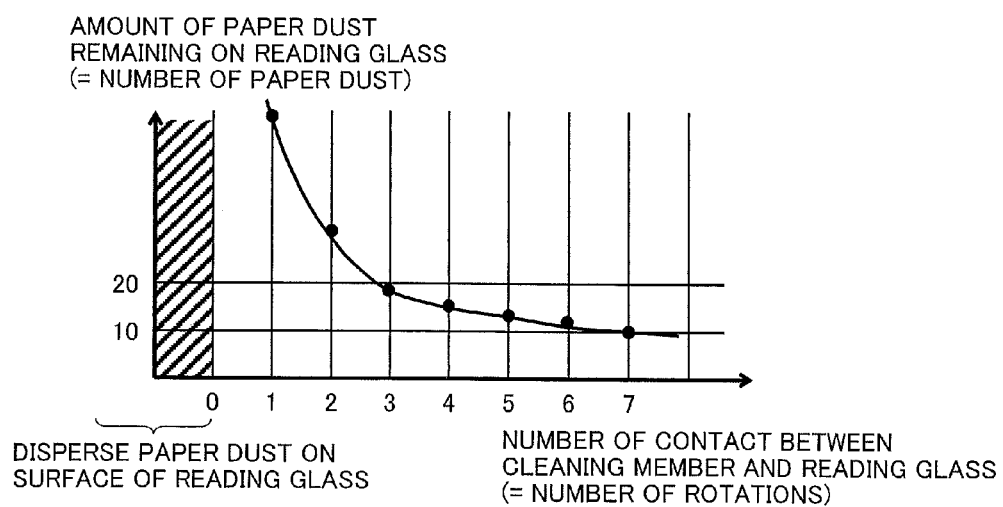
FIG. 5 illustrates a relationship between the number of rotations of the rotating body and the amount of paper dust remaining on a surface of the reading glass, which is obtained from an experiment by the inventor.

As a result of this experiment, the relationship in FIG. 5 between the number of rotations of the rotating body and the amount of paper dust remaining on the surface of the reading glass was obtained. According to this experimental result, it was confirmed that by increasing the number of rotations of the rotating body to a certain extent, the cleaning ability of the system in which the rotating body provided with the cleaning member is rotated stabilizes with a narrow range of variations.

Cleaning the reading glass by the brush-like cleaning member in contact with the reading glass functions to produce friction on the glass surface, which becomes a cause of stripping of a coating or generation of a minute flaw. Therefore, the cleaning operation is preferably minimized for the purpose of ensuring the durability of the reading glass. In addition, as is also shown in FIG. 5, the effect of reducing the amount of paper dust by the cleaning operation decreases as the amount of paper dust on the reading glass decreases. Thus, in image reading apparatus 100 according to the first embodiment, the frequency of cleaning in first reading unit 102A (CCD) is set to one cleaning per reading of three sheets of documents and the frequency of cleaning in second reading unit 102B (CIS) is set to one cleaning per reading of one sheet of document.

More preferably, in image reading apparatus 100 according to the first embodiment, the frequency of cleaning in second reading unit 102B (CIS) is switched in accordance with the reading mode. As one example, since second reading unit 102B does not operate in a single-sided reading mode in which only first reading unit 102A performs image reading, the cleaning operation in second reading unit 102B is not performed. As another example, since noise streaks of approximately 1 dot resulting from paper dust are thinned out and become less prominent by image processing in a low resolution reading mode, which is a mode such as a facsimile mode and a scan mode for obtaining a low-capacity image file, the frequency of cleaning in second reading unit 102B is made equal to the frequency of cleaning in first reading unit 102A.

The operation of image reading apparatus 100 according to the first embodiment will be described using FIG. 11 and flowcharts in FIGS. 12 to 14. The operation shown in the flowcharts in FIGS. 12 to 14 starts when control unit 500 accepts an instruction signal for providing an instruction to start reading (for example, to start copying and the like) from the not-shown control panel and the like. The not-shown CPU included in control unit 500 reads and executes a program stored in memory 600, thereby implementing the operation shown in the flowcharts in FIGS. 12 to 14. It is noted that in the following description, a surface of a document read by first reading unit 102A may be referred to as "front surface" and a surface of the document read by second reading unit 102B may be referred to as "rear surface" for the sake of convenience.

Figure 12:
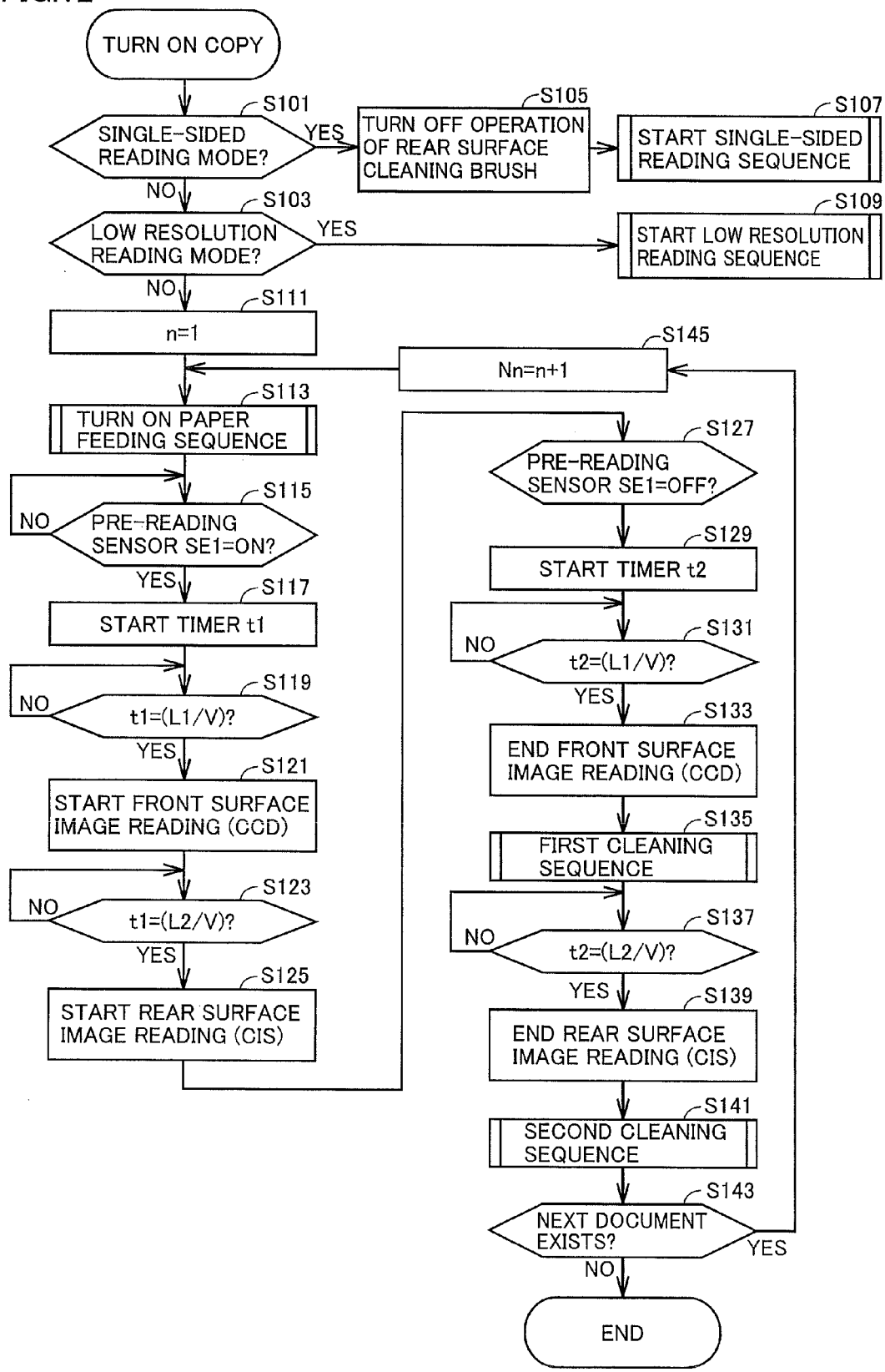
FIG. 12 is a flowchart illustrating a flow of an operation of the image reading apparatus according to the first embodiment.

Referring to FIG. 12, upon start of the reading operation, control unit 500 initially analyzes the instruction signal from the control panel and the like, and identifies the reading mode. When the reading mode is the single-sided reading mode (YES in step S101), control unit 500 determines that the cleaning operation on the second reading unit 102B side is not to be performed, and turns off the mechanism (such as motor 234B) for rotationally driving rotating body 310B of second reading unit 102B in step S105. Thereafter, a single-sided reading sequence starts in accordance with the instruction signal (step S107). When the reading mode is the low resolution reading mode (YES in step S103), a low resolution reading sequence starts, which includes a normal cleaning sequence in which the frequency of cleaning in first reading unit 102A is equal to the frequency of cleaning in second reading unit 102B, the normal cleaning sequence being different from a subsequent cleaning sequence in which these frequencies of cleaning are different (step S109).

When the reading mode is neither the single-sided reading mode nor the low resolution reading mode, that is, when the reading mode is a double-sided reading mode at normal resolution (NO in step S101 and NO in step S103), a variable n indicating the number of pages of the document is set to an initial value of 1 in step S111, and thereafter, a paper feeding sequence starts in step S113. As a result, the documents loaded onto document tray 200 are taken in one by one to the conveying path by pickup roller 201A and separating roller 201B, and are conveyed along the conveying path toward first reading unit 102A at a speed V as shown in FIG. 11.

The conveying path is provided with several sensors as is also shown in FIG. 2, and the sensors are connected to the not-shown CPU included in control unit 500. Control unit 500 may identify a position of the document on the conveying path based on a sensor signal. When control unit 500 accepts input of the sensor signal from a sensor SE1 arranged on the upstream side of first reading unit 102A as shown in FIG. 11, that is, when it is detected that the tip of the conveyed document has reached a position of sensor SE1 (YES in step S115), control unit 500 starts a not-shown first timer included in control unit 500 to measure a time period that has elapsed since the tip of the document reached the position of sensor SE1 in step S117. The measured time period that has elapsed since the tip of the document reached the position of sensor SE1 is indicated with a timer value t1.

When timer value t1 has reached L1/V corresponding to a time period over which the document travels a distance L1 from the position of sensor SE1 to reading position 211 of first reading unit 102A, that is, when it is detected that the tip of the document has reached reading position 211 (YES in step S119), control unit 500 determines that an operation for reading the front surface of the document is to be started in first reading unit 102A. In step S121, drive control unit 502 drives the reading mechanism of first reading unit 102A and the operation for reading the conveyed document starts in first reading unit 102A.

Subsequently, when timer value t1 has reached L2/V corresponding to a time period over which the document travels a distance L2 from the position of sensor SE1 to reading position 306 of second reading unit 102B, that is, when it is detected that the tip of the document has reached reading position 306 (YES in step S123), control unit 500 determines that an operation for reading the rear surface of the document is to be started in second reading unit 102B. In step S125, drive control unit 502 drives the reading mechanism of second reading unit 102B and the operation for reading the conveyed document starts in second reading unit 102B.

When the input of the sensor signal from sensor SE1 ends, that is, when it is detected that the rear end of the conveyed document has passed through the position of sensor SE1 (YES in step S127), control unit 500 starts a not-shown second timer included in control unit 500 to measure a time period that has elapsed since the rear end of the document passed through the position of sensor SE1 in step S129. The measured time period that has elapsed since the rear end of the document passed through the position of sensor SE1 is indicated with a timer value t2.

When timer value t2 has reached L1/V corresponding to the time period over which the document travels distance L1 from the position of sensor SE1 to reading position 211 of first reading unit 102A, that is, when it is detected that the rear end of the document has passed through reading position 211 (YES in step S131), control unit 500 determines that the operation for reading the document in first reading unit 102A is to be ended, and drive control unit 502 ends driving of the reading mechanism in step S133. Thereafter, a first cleaning sequence for the cleaning operation in first reading unit 102A is performed in step S135.

Subsequently, when timer value t2 has reached L2/V corresponding to the time period over which the document travels distance L2 from the position of sensor SE1 to reading position 306 of second reading unit 102B, that is, when it is detected that the rear end of the document has passed through reading position 306 (YES in step S137), control unit 500 determines that the operation for reading the document in second reading unit 102B is to be ended, and drive control unit 502 ends driving of the reading mechanism in step S139. Thereafter, a second cleaning sequence for the cleaning operation in second reading unit 102B is performed in step S141.

When a next document exists on document tray 200 (YES in step S143), control unit 500 increments variable n indicating the number of pages of the document by 1 in step S145, and then, repeats the operation from the above steps S113 to S141 for the next document. When the operations end for all documents loaded onto document tray 200 (NO in step S143), control unit 500 ends a series of operations.

The first cleaning sequence for the cleaning operation in first reading unit 102A in the above step S135 and the second cleaning sequence for the cleaning operation in second reading unit 102B in step S141 will be further described with reference to the flowcharts in FIGS. 13 and 14. A sensor SE2 and a sensor SE3 (sensor 312) shown in FIG. 11 are provided in proximity to rotating bodies 310A and 310B, respectively, and are connected to the not-shown CPU included in control unit 500. Sensors SE2 and SE3 detect that rotating bodies 310A and 310B are located at the home position and input sensor signals to the CPU, respectively. Based on the sensor signals, control unit 500 can detect that rotating bodies 310A and 310B are located at the home position.

Figure 13:
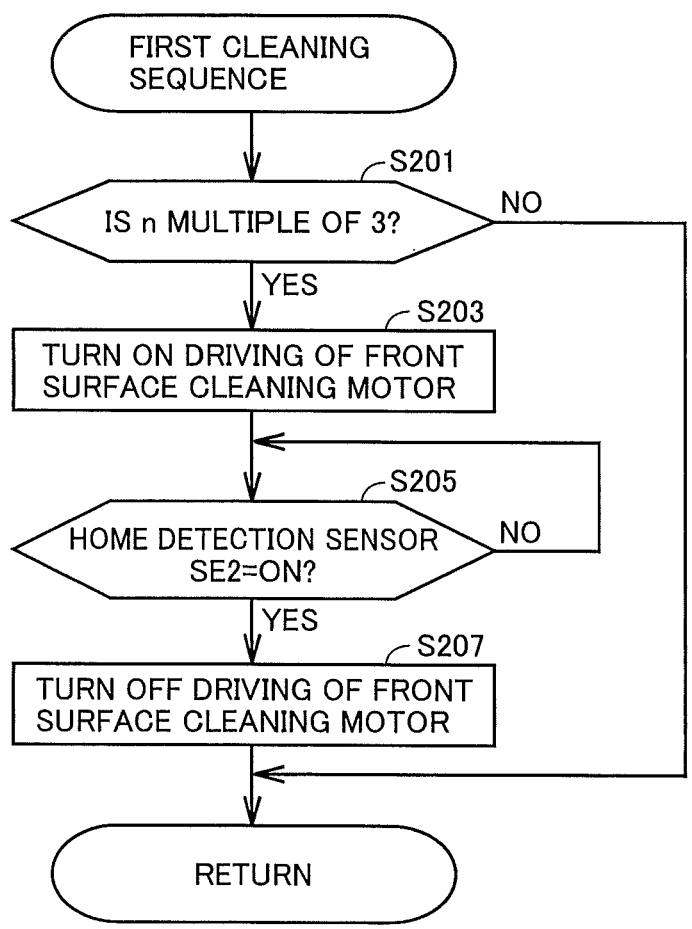
FIG. 13 is a flowchart illustrating a first cleaning sequence which is a cleaning operation in the first reading unit (CCD).

Referring to FIG. 13, in the first cleaning sequence, when the number of pages of the document to be processed is a multiple of 3 (YES in step S201), control unit 500 determines that the cleaning operation in first reading unit 102A is to be performed, and drive control unit 502 drives motor 234A serving as the drive mechanism for rotating body 310A in step S203. As a result, rotating body 310A waiting at the home position starts to rotate and the cleaning member cleans reading glass 215 of first reading unit 102A.

Thereafter, when control unit 500 accepts input of the sensor signal from sensor SE2 provided in proximity to rotating body 310A, that is, when it is detected that rotating body 310A has rotated and then returned to the home position (YES in step S205), control unit 500 determines that the cleaning operation in first reading unit 102A is to be ended, and drive control unit 502 ends driving of motor 234A serving as the drive mechanism for rotating body 310A in step S207.

In the first cleaning sequence, when the number of pages of the document to be processed is not a multiple of 3 (NO in step S201), a series of cleaning operations is not performed.

Figure 14:
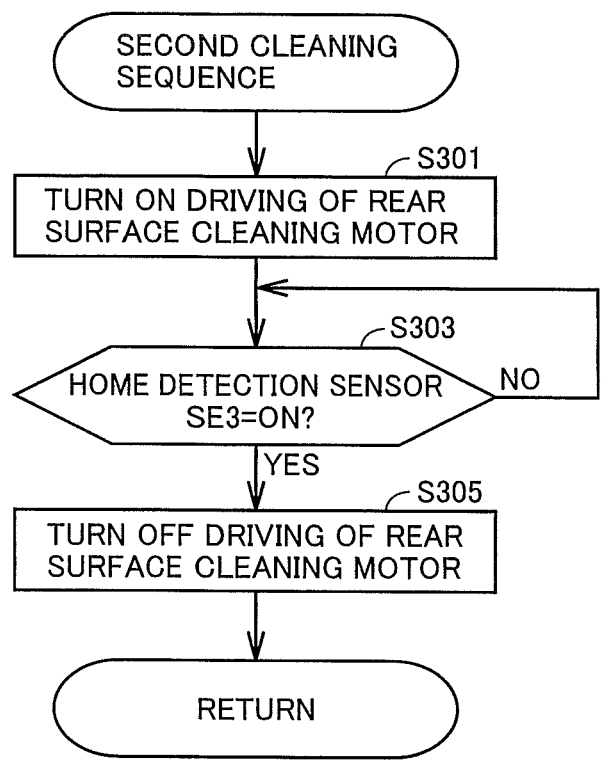
FIG. 14 is a flowchart illustrating a second cleaning sequence which is a cleaning operation in the second reading unit (CIS).

Referring to FIG. 14, in the second cleaning sequence, when the reading operation in second reading unit 102B ends in step S139, control unit 500 determines that the cleaning operation in second reading unit 102B is to be performed, and drive control unit 502 drives motor 234B serving as the drive mechanism for rotating body 310B in step S301. As a result, rotating body 310B waiting at the home position starts to rotate and the cleaning member cleans reading glass 302 of second reading unit 102B.

Thereafter, when control unit 500 accepts input of the sensor signal from sensor SE3 provided in proximity to rotating body 310B, that is, when it is detected that rotating body 310B has rotated and then returned to the home position (YES in step S303), control unit 500 determines that the cleaning operation in second reading unit 102B is to be ended, and drive control unit 502 ends driving of motor 234B serving as the drive mechanism for rotating body 310B in step S305.

The above operation is performed in image reading apparatus 100 according to the first embodiment, and thus, one cleaning operation per reading of three sheets of documents is performed in first reading unit 102A and one cleaning operation per reading of one sheet of document is performed in second reading unit 102B. Furthermore, in the single-sided reading mode, the cleaning operation in second reading unit 102B is not performed. In addition, in the low resolution reading mode, the frequency of cleaning in second reading unit 102B is made equal to the frequency of cleaning in first reading unit 102A. As a result, the total number of cleaning can be suppressed and the durability of the reading glass can be ensured.

Similarly to the previous experiment, the inventor used, as documents, high-quality papers of the six types of paper A to paper F as described above, and caused image reading apparatus 100 according to the first embodiment to convey and read 500 sheets of each type of the high-quality papers. The inventor calculated the frequency of occurrence of noise streaks in each of first reading unit 102A (CCD) and second reading unit 102B (CIS) for each paper. At this time, document conveying speed V was about 280 mm/s, the distance from the position of sensor SE1 to reading position 211 was about 50 mm, and the distance from the position of sensor SE1 to reading position 306 was about 90 mm.

Figure 15:
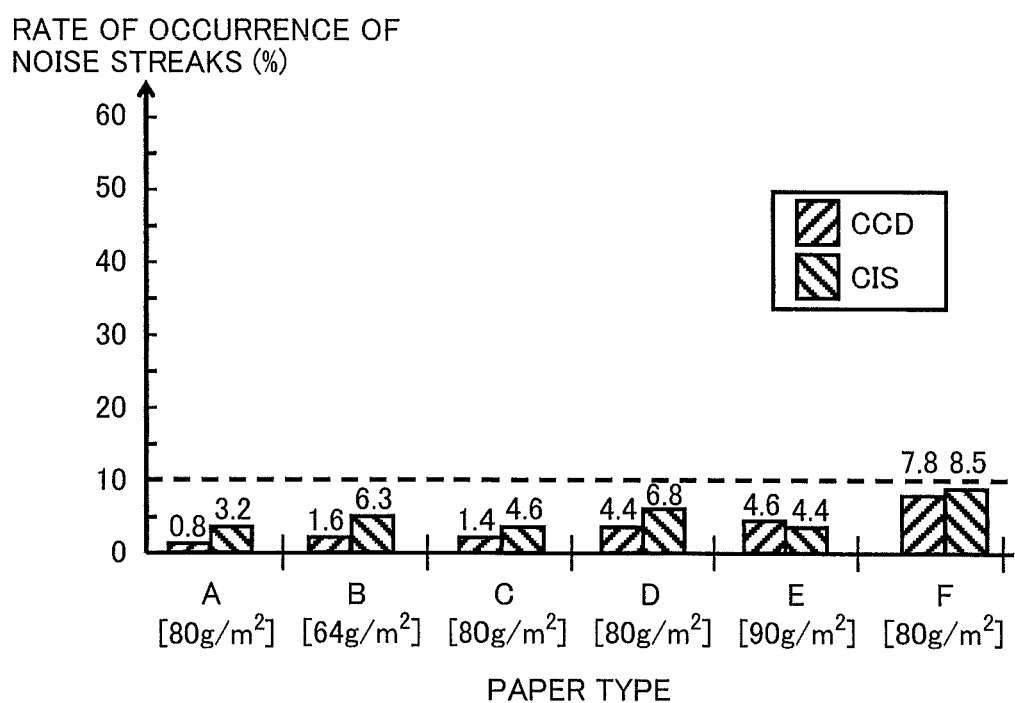
FIG. 15 illustrates a result of a calculation made by the inventor about the frequency of occurrence of noise on a read image in the image reading apparatus according to the first embodiment.

As a result of this experiment, it was found that a difference between the frequency of occurrence of noise streaks in first reading unit 102A (CCD) and the frequency of occurrence of noise streaks in second reading unit 102B (CIS) was significantly decreased as compared with the experimental result in FIG. 6, as shown by a bar graph in FIG. 15. In addition, when a target level of the frequency of occurrence of noise streaks was set to 10%, it was found that the frequency of occurrence of noise streaks was below the target level in all paper types even when one cleaning operation per reading of three sheets of documents was performed in first reading unit 102A (CCD). This showed that the operation of image reading apparatus 100 according to the first embodiment allows ensuring the same level of the quality of images read by both first reading unit 102A and second reading unit 102B while ensuring the durability of the reading glass, and allows achieving the target level for the quality of these images.

It is noted that image reading apparatus 100 according to the first embodiment may be configured such that two types of modes, that is, a first mode in which one cleaning operation is performed per reading of one sheet of document and a second mode in which one cleaning operation is performed per reading of three sheets of documents as in first reading unit 102A, are prepared as the frequency mode of the cleaning operation in second reading unit 102B, and the frequency mode is switched as necessary. In this case, when the reading mode is the double-sided reading mode and the low resolution reading mode, control unit 500 can perform control such that the cleaning operation at the frequency indicated by the above second mode, of the cleaning operations included in the above operation, is performed in second reading unit 102B.

This also allows enhancing the cleaning ability on the CIS side and ensuring the durability of the reading glass at the same time.

[Second Embodiment]

As a second embodiment, in image reading apparatus 100, the cleaning ability on the second reading unit 102B (CIS) side is made higher than the cleaning ability on the first reading unit 102A side by adjusting the rotation speed of the rotating body in the cleaning operation.

Figure 16:
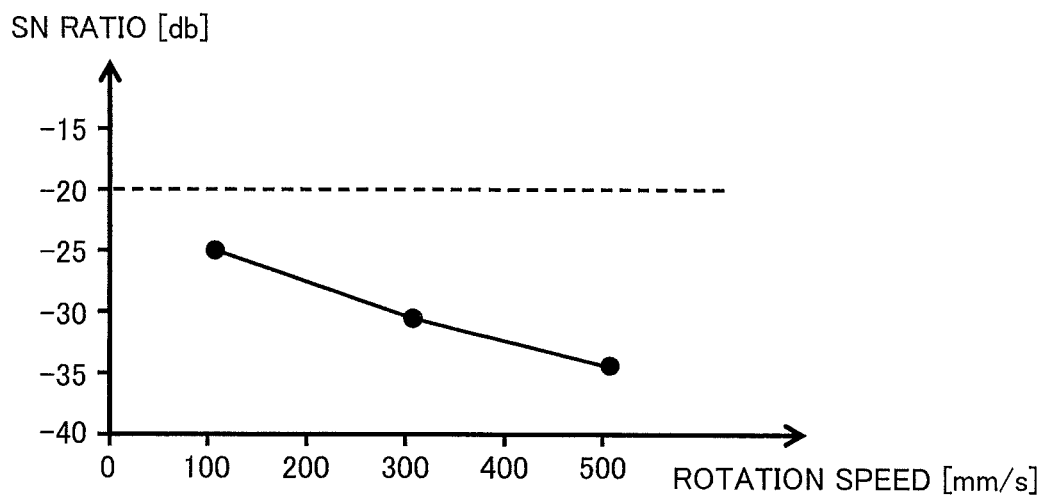
FIG. 16 illustrates a result of an evaluation made by the inventor in accordance with the Taguchi Method about a relationship between the cleaning ability and the rotation speed of the rotating body provided with a cleaning member.

Here, the inventor evaluated the relationship between the rotation speed of the rotating body provided with the cleaning member and the cleaning ability, using the Taguchi Method. As a result of the evaluation, the inventor obtained the relationship between the rotation speed and the SN ratio as shown in FIG. 16. In the Taguchi Method, the higher the SN ratio is, the higher the stability of the performance is, and the result in FIG. 16 shows that the slower the rotation speed of the rotating body is, the higher the SN ratio is and the higher the cleaning ability is.

Figure 17:
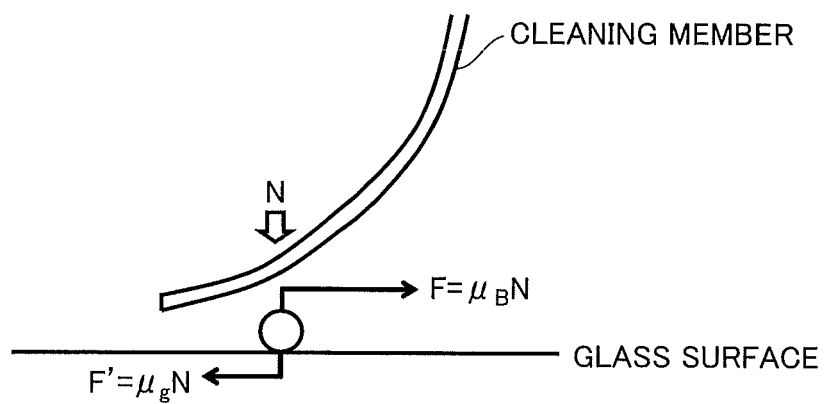
FIG. 17 is a diagram for describing a reason why the cleaning ability becomes higher as the rotation speed of the rotating body decreases.

A reason for this is considered as follows: as shown in FIG. 17, as a result of contact of the cleaning member with paper dust on the surface of the reading glass, force F ($=\mu_B N$) acts on the paper dust in a direction of the cleaning operation by the cleaning member (in the right direction in FIG. 17) and force F' ($=\mu_g N$) acts on the paper dust in a direction opposite to the direction of the cleaning operation (in the left direction in FIG. 17), where N represents the pressing force of the cleaning member against the paper dust, $\mu_B$ represents a friction coefficient between the cleaning member and the paper dust, and $\mu_g$ represents a friction coefficient between the surface of the reading glass and the paper dust. Force F is a force that removes the paper dust from the surface of the reading glass, and force F' is a force that keeps the paper dust on the surface of the reading glass. Accordingly, when force F is larger than force F' (F>F'), the paper dust is removed from the surface of the reading glass, and when force F is smaller than force F' (F<F'), the paper dust is kept without being removed from the surface of the reading glass.

Here, friction coefficient $\mu_g$ between the surface of the reading glass and the paper dust is stable because friction coefficient $\mu_g$ is a condition for stop, whereas friction coefficient $\mu_B$ between the cleaning member and the paper dust as well as pressing force N are not stable because friction coefficient $\mu_B$ and pressing force N are conditions involving an operation. In other words, pressing force N is not stable because pressing force N acts only in a limited range and easily changes due to vibration and the like of the cleaning member. In addition, friction coefficient $\mu_B$ between the cleaning member and the paper dust is not stable because a dynamic friction state is produced between the cleaning member and the paper dust and a slip easily occurs when the speed of the cleaning operation by the cleaning member increases. Accordingly, force F exerted on the paper dust by the cleaning member decreases easily depending on the speed of the cleaning member, and when the speed of the cleaning member, that is, the rotation speed of the rotating body increases, a slip phenomenon occurs between the cleaning member and the paper dust and force F decreases. As a result, force F becomes smaller than force F', which leads to keeping the paper dust without removal from the surface of the reading glass.

The cleaning ability in second reading unit 102B is enhanced by decreasing a rotation speed V2 of rotating body 310B of second reading unit 102B. During the cleaning operation, however, the reading operation in second reading unit 102B is not performed, and thus, the reading productivity of image reading apparatus 100 decreases. Accordingly, in the single-sided reading mode used at a frequency of 90%, the productivity is ensured by setting a rotation speed V1 of rotating body 310A on the first reading unit 102A (CCD) side to a high speed. In the double-sided reading mode, enhancing the cleaning ability on the CIS side and ensuring the productivity can be achieved at the same time by making rotation speed V2 of rotating body 310B of second reading unit 102B (CIS) slower than rotation speed V1 of rotating body 310A on the first reading unit 102A (CCD) side to lengthen an interval between documents. In other words, based on the verification described above, rotation speed V2 of rotating body 310B of second reading unit 102B caused by motor 234B is set to be slower than rotation speed V1 of rotating body 310A of first reading unit 102A caused by motor 234A in image reading apparatus 100 according to the second embodiment. Specific examples of rotation speeds V1 and V2 include approximately V1=300 mm/s and V2=150 mm/s, for example. By setting the rotation speeds of the respective rotating bodies in such a manner, the cleaning ability on the second reading unit 102B (CIS) side can be made higher than the cleaning ability on the first reading unit 102A (CCD) side and a difference between the front surface and the rear surface in terms of the quality of read images can be suppressed.

Alternatively, in the cleaning operation in image reading apparatus 100 according to the second embodiment as well, the cleaning operation in second reading unit 102B (CIS) can be switched in accordance with the reading mode, similarly to the operation in the first embodiment. As one example, since second reading unit 102B does not operate in the single-sided reading mode in which only first reading unit 102A performs image reading, the cleaning operation in second reading unit 102B is not performed. As another example, since noise streaks of approximately 1 dot resulting from paper dust are thinned out and become less prominent by image processing in the low resolution reading mode, which is the mode such as a facsimile mode and a scan mode for obtaining a low-capacity image file, the rotation speed of rotating body 310B of second reading unit 102B is made equal to the rotation speed of rotating body 310A of first reading unit 102A.

In this case, in image reading apparatus 100 according to the second embodiment as well, the operation is performed, which is similar to the operation in image reading apparatus 100 according to the first embodiment described using FIG. 11 and the flowcharts in FIGS. 12 to 14. In other words, upon start of the reading operation, control unit 500 identifies the reading mode. When the reading mode is the single-sided reading mode (YES in step S101), the cleaning operation on the second reading unit 102B side is not performed. In addition, when the reading mode is the low resolution reading mode (YES in step S103), the low resolution reading sequence including the normal cleaning sequence is performed.

When the reading mode is the double-sided reading mode and the high resolution reading mode (NO in step S101 and NO in step S103), the cleaning operations are performed in first reading unit 102A and second reading unit 102B at the respective timings shown in the flowchart in FIG. 12. At this time, in image reading apparatus 100 according to the second embodiment, the rotation speed of rotating body 310B of second reading unit 102B (CIS) is slower than the rotation speed of rotating body 310A of first reading unit 102A (CCD).

The above operation is performed in image reading apparatus 100 according to the second embodiment, and thus, enhancing the cleaning ability on the CIS side and ensuring the reading productivity can be achieved at the same time.

[Third Embodiment]

As a third embodiment, in image reading apparatus 100, the cleaning ability on the second reading unit 102B (CIS) side is made higher than the cleaning ability on the first reading unit 102A side by making different the cleaning member included in rotating body 310A of first reading unit 102A and the cleaning member included in rotating body 310B of second reading unit 102B.

In other words, the brush-like cleaning member having higher rigidity allows enhancing the cleaning ability because the cleaning member comes into contact with the surface of the reading glass with reliability. Thus, in image reading apparatus 100 according to the third embodiment, the cleaning member on the second reading unit 102B (CIS) side is made higher in thickness and density than the cleaning member on the first reading unit 102A (CCD) side. As a specific example, a cleaning member having a thickness of one bristle of 2 D (denier) and a density of bristles of 240 kf/inch$^2$ is used as the cleaning member on the first reading unit 102A (CCD) side and a cleaning member having a thickness of one bristle of 4 D and a density of bristles of 180 kf/inch$^2$ is used as the cleaning member on the second reading unit 102B (CIS) side. By using such cleaning members, the cleaning ability on the second reading unit 102B (CIS) side can be made higher than the cleaning ability on the first reading unit 102A (CCD) side and a difference between the front surface and the rear surface in terms of the quality of read images can be suppressed.

On the other hand, the cleaning operation on the second reading unit 102B side using the cleaning member having high thickness and density functions to produce more friction on the glass surface as previously described, which becomes a cause of stripping of a coating or generation of a minute flaw. Therefore, the cleaning operation using the cleaning member having high thickness and density, in particular, is preferably minimized for the purpose of ensuring the durability of the reading glass. Thus, in the cleaning operation in image reading apparatus 100 according to the third embodiment, the cleaning operation in second reading unit 102B (CIS) can be switched in accordance with the reading mode, similarly to the operation in the first embodiment. As one example, since second reading unit 102B does not operate in the single-sided reading mode in which only first reading unit 102A performs image reading, the cleaning operation in second reading unit 102B is not performed.

In image reading apparatus 100 according to the third embodiment as well, the operation is performed, which is similar to the operation in image reading apparatus 100 according to the first embodiment described using FIG. 11 and the flowcharts in FIGS. 12 to 14. In other words, upon start of the reading operation, control unit 500 identifies the reading mode. When the reading mode is the single-sided reading mode (YES in step S101), the cleaning operation on the second reading unit 102B side is not performed.

When the reading mode is the double-sided reading mode (NO in step S101), the cleaning operations are performed in first reading unit 102A and second reading unit 102B at the respective timings shown in the flowchart in FIG. 12. At this time, in image reading apparatus 100 according to the third embodiment, the cleaning operation is performed on the second reading unit 102B (CIS) side using the cleaning member having higher thickness and density than the cleaning member on the first reading unit 102A (CCD) side.

The above operation is performed in image reading apparatus 100 according to the third embodiment, and thus, enhancing the cleaning ability on the CIS side and ensuring the durability of the reading glass can be achieved at the same time.

It is noted that image reading apparatus 100 according to the third embodiment may be configured such that second reading unit 102B is provided with two rotating bodies, that is, a first rotating body provided with the above cleaning member having high thickness and density and a second rotating body provided with a cleaning member similar to the cleaning member on the first reading unit 102A side, and which rotating body to use is switched as necessary. In other words, positions of the first rotating body and the second rotating body may be variable in second reading unit 102B, and connection between these rotating bodies and motor 234B may be variable. In this case, when the reading mode is the double-sided reading mode and the low resolution reading mode, control unit 500 can perform control such that the cleaning operation using the above second rotating body, of the cleaning operations included in the above operation, is performed in second reading unit 102B.

This also allows enhancing the cleaning ability on the CIS side and ensuring the durability of the reading glass can be achieved at the same time.

[Modification]

In the first to third embodiments described above, by adjusting the number of cleaning operations to be performed, by adjusting the rotation speed of the rotating body, and by adjusting the cleaning member, respectively, the cleaning ability on the second reading unit 102B (CIS) side is made higher than the cleaning ability on the first reading unit 102A (CCD) side and a difference between the front surface and the rear surface in terms of the quality of read images is suppressed. As a modification, however, at least two of the operations and configurations according to these three embodiments may be combined in image reading apparatus 100.

This allows ensuring the durability of the reading glass and ensuring the reading productivity while suppressing a difference between the front surface and the rear surface in terms of the quality of reading.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image reading apparatus, comprising:
   a conveying unit for conveying documents one by one;
   a first reading unit for optically reading said conveyed document through a first transparent member provided at a first reading position on a conveying path in said conveying unit;
   a first cleaning unit for cleaning said first transparent member provided at said first reading position;
   a second reading unit for optically reading said conveyed document through a second transparent member provided at a second reading position on the conveying path in said conveying unit and on a downstream side of said first reading position;

a second cleaning unit for cleaning said second transparent member provided at said second reading position, said second cleaning unit being higher in cleaning ability than said first cleaning unit, wherein an amount of paper dust removed by said second cleaning unit is more than an amount of paper dust removed by said first cleaning unit.

2. The image reading apparatus according to claim 1, wherein
said first reading unit includes a CCD (Charged Coupled Device) and said second reading unit includes a CIS (Contact Image Sensor).

3. The image reading apparatus according to claim 1, wherein
said first cleaning unit and said second cleaning unit have cleaning members, and clean said first and said second transparent members by moving said cleaning members on said first and said second transparent members, respectively, and
said cleaning member of said second cleaning unit is slower in moving speed than said cleaning member of said first cleaning unit.

4. The image reading apparatus according to claim 1, wherein a frequency of cleaning by said second cleaning unit is higher than a frequency of cleaning by said first cleaning unit.

5. The image reading apparatus according to claim 4, further comprising
a first control unit for controlling a drive mechanism for said first cleaning unit and a drive mechanism for said second cleaning unit, wherein
said first control unit switches the frequency of cleaning by said second cleaning unit in accordance with an image reading mode.

6. The image reading apparatus according to claim 5, wherein
said first control unit makes equal the frequency of cleaning by said second cleaning unit and the frequency of cleaning by said first cleaning unit when the image reading mode is a low resolution mode, and makes the frequency of cleaning by said second cleaning unit higher than the frequency of cleaning by said first cleaning unit when the image reading mode is a high resolution mode.

7. The image reading apparatus according to claim 1, wherein
each of said first cleaning unit and said second cleaning unit has a cleaning member that is an assembly formed of a plurality of elements, and
said assembly of said second cleaning unit is higher in density than said assembly of said first cleaning unit.

8. The image reading apparatus according to claim 7, wherein
said second cleaning unit has a first cleaning member equal to the cleaning member of said first cleaning unit and a second cleaning member higher in density of said assembly than the cleaning member of said first cleaning unit,
the image reading apparatus further comprises a first control unit for controlling switching of the cleaning members of said second cleaning unit, and
said first control unit switches the cleaning members of said second cleaning unit in accordance with an image reading mode.

9. The image reading apparatus according to claim 8, wherein
said first control unit selects said first cleaning member as the cleaning member used in said second cleaning unit when the image reading mode is a low resolution mode, and selects said second cleaning member as the cleaning member used in said second cleaning unit when the image reading mode is a high resolution mode.

10. The image reading apparatus according to claim 1, wherein
each of said first cleaning unit and said second cleaning unit has a rigid cleaning member, and
said cleaning member of said second cleaning unit is higher in rigidity than said cleaning member of said first cleaning unit.

11. The image reading apparatus according to claim 10, wherein
said second cleaning unit has a first cleaning member equal to the cleaning member of said first cleaning unit and a second cleaning member higher in rigidity than the cleaning member of said first cleaning unit,
the image reading apparatus further comprises a first control unit for controlling switching of the cleaning members of said second cleaning unit, and
said first control unit switches the cleaning members of said second cleaning unit in accordance with an image reading mode.

12. The image reading apparatus according to claim 11, wherein
said first control unit selects said first cleaning member as the cleaning member used in said second cleaning unit when the image reading mode is a low resolution mode, and selects said second cleaning member as the cleaning member used in said second cleaning unit when the image reading mode is a high resolution mode.

13. The image reading apparatus according to claim 1, further comprising
a second control unit for controlling a drive mechanism for said first cleaning unit and a drive mechanism for said second cleaning unit, wherein
said second control unit controls execution of a cleaning operation in said second cleaning unit in accordance with an image reading mode.

14. The image reading apparatus according to claim 13, wherein
said second control unit does not cause execution of the cleaning operation in said second cleaning unit when the image reading mode is a single-sided reading mode in which only a surface on said first reading unit side of surfaces of said document is read, and causes execution of the cleaning operation in said second cleaning unit when the image reading mode is a double-sided reading mode in which both surfaces on said first reading unit side and on said second reading unit side are read.

15. An image reading apparatus, comprising:
a conveying unit for conveying a document;
an introducing unit formed of a pickup roller and a pickup roller-facing member, for introducing one sheet of a plurality of loaded documents into said conveying unit;
a first reading unit for optically reading said conveyed document through a first transparent member provided at a first reading position on a conveying path in said conveying unit;
a first cleaning unit for cleaning said first transparent member provided at said first reading position;
a second reading unit for optically reading said conveyed document through a second transparent member provided at a second reading position on the conveying path in said conveying unit; and
a second cleaning unit for cleaning said second transparent member provided at said second reading position, said first reading position being a reading position on said pickup roller side on said conveying path, said second reading position being a reading position on said pickup roller-facing member side on said conveying path, said second cleaning unit being higher in cleaning ability than said first cleaning unit, wherein an amount of paper dust removed by said second cleaning unit is more than an amount of paper dust removed by said first cleaning unit; and wherein said pickup roller-facing member is a member producing a friction force between the document and said pickup roller-facing member in a direction opposite to a conveying direction by said pickup roller.

16. The image reading apparatus according to claim 15, wherein
said pickup roller-facing member is a roller rotating in a direction opposite to a direction of rotation of said pickup roller.

17. An image forming apparatus having an image reading apparatus, said image reading apparatus comprising:
a conveying unit for conveying documents one by one;
a first reading unit for optically reading said conveyed document through a first transparent member provided at a first reading position on a conveying path in said conveying unit;
a first cleaning unit for cleaning said first transparent member provided at said first reading position;
a second reading unit for optically reading said conveyed document through a second transparent member provided at a second reading position on the conveying path in said conveying unit and on a downstream side of said first reading position;
a second cleaning unit for cleaning said second transparent member provided at said second reading position,
said second cleaning unit being higher in cleaning ability than said first cleaning unit, wherein an amount of paper dust removed by said second cleaning unit is more than an amount of paper dust removed by said first cleaning unit.

18. An image forming apparatus having an image reading apparatus, said image reading apparatus comprising:
a conveying unit for conveying a document;
an introducing unit formed of a pickup roller and a pickup roller-facing member, for introducing one sheet of a plurality of loaded documents into said conveying unit;
a first reading unit for optically reading said conveyed document through a first transparent member provided at a first reading position on a conveying path in said conveying unit;
a first cleaning unit for cleaning said first transparent member provided at said first reading position;
a second reading unit for optically reading said conveyed document through a second transparent member provided at a second reading position on the conveying path in said conveying unit; and
a second cleaning unit for cleaning said second transparent member provided at said second reading position,
said first reading position being a reading position on said pickup roller side on said conveying path, said second reading position being a reading position on said pickup roller-facing member side on said conveying path, said second cleaning unit being higher in cleaning ability than said first cleaning unit, wherein an amount of paper dust removed by said second cleaning unit is more than an amount of paper dust removed by said first cleaning unit, and wherein said pickup roller-facing member is a member producing a friction force between the document and said pickup roller-facing member in a direction opposite to a conveying direction by said pickup roller.

19. An automatic document conveying apparatus, comprising:
a conveying unit for conveying documents one by one;
a first cleaning unit for cleaning a first transparent member provided at a first reading position on a conveying path in said conveying unit corresponding to a reading position of a reading apparatus for optically reading said conveyed document;
a reading unit for optically reading said conveyed document through a second transparent member provided at a second reading position on the conveying path in said conveying unit and on a downstream side of said first reading position;
a second cleaning unit for cleaning said second transparent member provided at said second reading position,
said second cleaning unit being higher in cleaning ability than said first cleaning unit, wherein an amount of paper dust removed by said second cleaning unit is more than an amount of paper dust removed by said first cleaning unit.

20. An automatic document conveying apparatus, comprising:
a conveying unit for conveying a document;
an introducing unit formed of a pickup roller and a pickup roller-facing member, for introducing one sheet of a plurality of loaded documents into said conveying unit;
a first cleaning unit for cleaning a first transparent member provided at a first reading position on a conveying path in said conveying unit and corresponding to a surface of the document on said pickup roller side, the first reading position corresponding to a reading position of a reading apparatus for optically reading said conveyed document;
a reading unit for optically reading said conveyed document through a second transparent member provided at a second reading position on the conveying path in said conveying unit and corresponding to a surface of the document on said pickup roller-facing member side; and
a second cleaning unit for cleaning said second transparent member provided at said second reading position,
said second cleaning unit being higher in cleaning ability than said first cleaning unit, wherein an amount of paper dust removed by said second cleaning unit is more than an amount of paper dust removed by said first cleaning unit, and
wherein said pickup roller-facing member is a member producing a friction force between the document and said pickup roller-facing member in a direction opposite to a conveying direction by said pickup roller.

* * * * *